United States Patent Office

Re. 28,141
Reissued Aug. 27, 1974

28,141

COMPOSITION CONTAINING 1-SUBSTITUTED-3-DI-SUBSTITUTED METHYLENE PYRROLIDINES AND METHODS OF TREATING DEPRESSION

Carl D. Lunsford, Richmond, Va., Grover C. Helsley, Pottersville, N.J., and John A. Richman, Jr., Silver Spring, Md., assignors to A. H. Robins Co., Incorporated, Richmond, Va.

No Drawing. Original No. 3,458,635, dated July 29, 1969, Ser. No. 570,717, Aug. 8, 1966. Application for reissue Apr. 12, 1973, Ser. No. 350,488
Int. Cl. A61k *27/00*
U.S. Cl. 424—274 7 Claims

Matter enclosed in heavy brackets [ ] appears in the original patent but forms no part of this reissue specification; matter printed in italics indicates the additions made by reissue.

ABSTRACT OF THE DISCLOSURE

The treatment of emotional and like disorders associated with depression and compositions *therefor* [therefore] comprising *1-substituted*-3-di-substituted methylene pyrrolidines.

The present invention relates to certain novel heterocyclic substituted pyrrolidine compounds, and more particularly, to compositions containing these compounds and to a method of treating therewith.

The novel compounds of the present invention have the following structural formula:

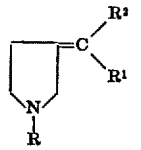

Formula I wherein:

R is selected from the group consisting of [hydrogen,] lower-alkyl, phenyl-lower-alkyl, substituted phenyl-lower-alkyl, cycloalkyl, phenoxylower-alkyl, phenylamino-lower-alkyl, and substituted phenyl, $R^1$ is selected from the group consisting of lower-alkyl, phenyl-lower-alkyl, cycloalkyl, phenyl and substituted phenyl, and $R^2$ is selected from the group consisting of phenyl and substituted phenyl, and

[Quaternary ammonium and] acid addition salts thereof.

The compounds of the Formula I are generally characterized by important pharmacological activity, indicative of their use in counteracting certain physiological abnormalities in an animal body. The compounds possess anti-depressant activity and are, therefore, useful as such; in particular, they possess imipramine-like anti-depressant pharmacological activity demonstrated in tests such as proposed by Dr. Beryl M. Askew, Life Sciences, No. 10, pages 725–730, 1963.

There are several previously known chemo-therapy agents that have been used in the treatment of depression; generally, they have been classified in two groups, the amine oxidase inhibitors and the iminodibenzyl derivatives (non-amine oxidase inhibitors). Phenelzine sulfate, nialamide, isocarboxazide, tranylcypromine, etryptamine acetate and pargyline hydrochloride, commonly referred to as "psychic energizers" are anti-depressant monoamine oxidase inhibitors (MAO). The MAO inhibitors were the first class of drugs to be introduced for treatment of depression and although dependably effective in most cases as anti-depressants, frequently caused adverse side effects. In particular, the enzyme inhibitory activity is sometimes prolonged, resulting in cumulative effects which potentiate other drugs commonly concurrently administered such as the sedative effects of tranquilizers and hypnotics, as well as the hypotensive effective thiazide drugs.

Non-MAO inhibitors previously used as anti-depressants are, for example, imipramine, amitriptyline, and more recently, desipramine and nortriptyline which are demethylated imipramine and amitriptyline respectively, and protriptyline. These compounds are short acting and non-cumulative and free from the potentiating effect of other drugs attributed to MAO inhibiting anti-depressants.

The compounds of the present invention are non-MAO inhibitors and, therefore, possess the advantages associated therewith. However, the compounds of this invention are of significantly different chemical structures and, therefore, provide anti-depressants of a novel class of structures not previously known to be anti-depressant.

It is accordingly an object of this invention to provide novel and useful compositions embodying the *1-substituted*-3-di-substituted methylene pyrrolidines as active ingredient and a method for the treatment of a living animal body therewith. Other objects of the invention will be apparent to one skilled in the art and still other objects will become apparent hereinafter.

The preferred method of preparing the compounds of this invention comprises the step of dehydrating a compound of the following formula:

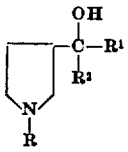

Formula II

The starting alcohols of Formula II may be obtained by procedures described in detail in copending application by Carl D. Lunsford et al., Ser. No. 570,722, filed Aug. 8, 1966 [on even date herewith], entitled "Esters of 1-Substituted-3-di-Substituted Pyrrolidine Methanols."

In general, the starting alcohols of Formula II may be prepared from 1-substituted-3-cyanopyrrolidines or 1-substituted-2-pyrrolidinones. The preparation of 1-susbstituted-3-cyanopyrrolidines has been disclosed in copending application Ser. No. 493,887, filed Oct. 7, 1965, now U.S. Pat. No. No. 3,318,908. The 1-substituted-2-pyrrolidinones are prepared by procedures well known in the art.

Utilizing the cyanopyrrolidines of the formula $$\underbrace{RNCH_2CH(CN)CH_2CH_2}$$

(all symbols being as defined above in connection with Formula I [except that R cannot be hydrogen]) they are reacted with a phenylmagnesium halide, a substituted phenylmagnesium halide or with a metal aryl such as phenyllithium. This reaction results in production of a 1-substituted-3-benzoylpyrrolidine or a 1 - substituted - 3-substituted benzoylpyrrolidine of the formula $$\underbrace{R-N-CH_2CH(COR^2)CH_2CH_2}$$

The 1-substituted-3-benzoylpyrrolidine or the 1 - substituted-3-substituted benzoylpyrrolidine is then reacted with an excess of a lower-alkyl, phenyl, phenyl alkyl, substituted phenyl alkyl or a cycloalkyl metal halide, or is reduced by metal hydride reduction to give a 1-substituted α,α-disubstituted-3-pyrrolidinemethanol of the formula $$\underbrace{R-N-CH_2CH_2(CR^1R^2OH)CH_2CH_2}$$

[When R in Formula I is hydrogen the compound is prepared starting from a 1-benzyl-α,α-disubstituted-3-pyrrolidinemethanol prepared as described above, the benzyl group being removed by hydrogenolysis as described in the following example.

Preparation.—Product: a-methyl-α-phenyl-3-pyrrolidinemethanol

A solution of 129 grams (0.46 mole) of 1-benzyl-α-methyl-α-phenyl-3-pyrrolidinemethanol in 150 ml. of 95% ethanol was placed in the reaction bottle of the catalytic reduction apparatus and 6 g. of 10% palladium-on-charcoal catalyst was added. The mixture was heated at 70° C. and shaken with hydrogen until an equivalent of hydrogen was absorbed (about two hours). After cooling, the suspension was filtered, and the solvent evaporated. The residue was distilled at reduced pressure and the fraction boiling at 111–113° C./.02 mm. collected. The water-white, viscous oil which solidified on cooling (M.P. 80–100° C.) weighed 52 g. (59% yield).

*Analysis.*—Calculated for $C_{12}H_{17}NO$: C, 75.35; H, 8.96; N, 7.32. Found: C, 75.18; H, 9.06; N, 7.37.]

In using the 1-substituted-2-pyrrolidinone of formula $$R-\underbrace{N-COCH_2CH_2CH_2}$$

(or as indicated above in connection with Formula I, the initial reaction is with a ketone of the formula $R^1COR^2$). The reaction is carried out in liquid ammonia in the presence of an alkali amide condensing agent to give a 1-substituted-2-oxo-α,α-disubstituted - 3 - pyrrolidine-methanol of the formula $$R-\underbrace{N-COCH(CR^1R^2OH)CH_2CH_2}$$

The alcohol thus formed is reduced by metal hydride reduction to give a 1-substituted - α,α - disubstituted-3-pyrrolidinemethanol of the formula $$R-\underbrace{N-CH_2CH(CR^1R^2OH)CH_2CH_2}$$

The dehydration reaction may be carried out by mixing a Formula I alcohol with an acid, including the use of a compound which is capable of forming an acid in situ in the reaction mixture in question. It is advantageous to use a strong mineral or organic acid such as a hydrogen halide, e.g., hydrochloric acid, or sulfuric acid, either concentrated or dilute, or in admixture with acetic acid, trichloroacetic acid, or a sulfonic acid such as benzenesulfonic or p-toluene sulfonic acid, or a compound which is capable of forming a strong acid in the reaction mixture, the dehydration thereby proceeding especially readily and smoothly. As an example[,] of such latter type compounds may be mentioned inorganic acid halides such as thionyl chloride, sulfuryl chloride, and phosphoric acid halides, such as phosphorus oxychloride and phosphorus trichloride, organic acid halides such as acetyl chloride and benzoyl chloride, and acid anhydrides such as sulfur trioxide, and the like.

In addition, weaker acids or compounds which are capable of forming weaker acids[,] in the reaction mixture may sometimes be used to effect the dehydration. As examples may be mentioned phosphoric acids, especially dilute phosphoric acid, dichloroacetic acid, oxalic acid, succinic acid, citric acid, boric acid, boric acid triacetate, and the like.

The said dehydration may in many cases be effected even with very small amounts of the said acids or acid-forming compounds and, according to a specially convenient modification procedure, such an acid or compound is used in the dehydration step in an amount substantially smaller than that equivalent to the saturated hydroxy-substituted starting material. In this manner, the formation of byproducts which might otherwise result from the dehydration is avoided or limited.

Further, it has been found that the dehydration proceeds especially readily and smoothly when carried out in the presence of an agent capable of binding the water liberated by the reaction, such as sodium sulfate or the like.

Likewise, it is sometimes advantageous to undertake the dehydration step in the presence of a solvent. Examples of suitable solvents are hydrocarbons, especially aromatic hydrocarbons such as benzene, toluene, or xylene, halogenated hydrocarbons such as chloroform, alkanols such as methanol and ethanol, ethers, acetic acid, and the like.

The dehydration in many cases proceeds smoothly even at room temperature and, especially in cases where the dehydration is effected by a strong acid or a compound capable of forming such strong acid in the reaction mixture in question, in an amount approximately equivalent to the amount of saturated hydroxy-substituted starting material or in excess. It is advantageous in some cases to carry out the dehydration while cooling in order to limit the formation of byproducts.

In order to secure a reasonable time of reaction, it may be convenient in other cases to omit cooling of the reaction mixture or even to undertake the dehydration at an increased temperature, e.g., in the vicinity of the boiling point of a solvent chosen for the dehydration step, e.g., up to about 120° C. However, no substantial amounts of byproducts are or need be formed even at such increased temperatures, it only being necessary that the acid or acid-providing compound be used in case of higher temperatures in an amount substantially less than that equivalent to the starting saturated hydroxy compound.

To illustrate the preferred process of the present invention, the following specific example is given:

[EXAMPLE 1A 3-ethylphenylmethylenepyrrolidine was prepared by mixing 6.0 grams (0.029 mole) of α-ethyl-α-phenyl-3-pyrrolidinemethanol and 60 ml. of 6 N hydrochloric acid. The reaction mixture was heated to reflux temperature and refluxed for 16 hours, and cooled and made basic with 25% sodium hydroxide. An oily layer separated to the bottom and was extracted with a solvent such as ether and the combined extracts were washed several times with cold water. The ether which acted as a solvent and did not enter the reaction, was then evaporated and the residual oil was distilled at reduced pressure and the fraction boiling at 75–77°/.02 mm. was collected; the non-viscous water-white oil weighed 3.5 grams (64% yield).

*Analysis.*—Calculated for $C_{13}H_{17}N$: C, 83.37; H, 9.15. Found: C, 83.18; H, 8.95.]

EXAMPLE [1B] *1*

Product: 1-ethyl - 3 - diphenylmethylenepyrrolidine hydrochloride.—To 150 ml. of 6 N HCl was added 20 grams (0.07 mole) of α,α-diphenyl-1-ethyl-3-pyrrolidinemethanol which was refluxed with magnetic stirring overnight. The reaction mixture was then cooled with ice bath and extracted twice with ether. The aqueous acidic layer was separated, made basic with 50% NaOH (in the cold) and extracted several times with ether. The ether extracts were combined, washed with water, and dried over $Na_2SO_4$. The ether extracts were evaporated, and the oily residue crystallized on standing. The oil was vacuum distilled at B.P. 135–140°/0.15 mm. An infrared spectrum on the oil showed loss of hydroxyl group and U.V. gave a peak at 248μ indicative of the grouping characteristic of benzophenone, thus confirming dehydration. A second distillation at B.P. 120–124° C./0.015 mm. gave an oil which crystallized as the free base. M.P. 45–46° C. The oil (or crystallized free base) was dissolved in anhydrous ethyl ether and was converted to the HCl salt by addition of ethereal HCl. Rubbing gave white crystals which could be recrystallized from absolute ethanol-ether mixture. The salt melted at 191–192° C. The yield was 14 grams (75%).

Analysis.—Calculated for $C_{19}H_{22}NCl$: C, 76.11; H, 7.40; N, 4.67; $Cl^-$, 11.82. Found: C, 75.91; H, 7.54; N, 4.75; $Cl^-$, 11.68.

In general, the reaction product may be isolated as indicated in the foregoing examples, or in any suitable manner. Thus, the basic product may be taken up in acid, neutral material separated therefrom by extraction of the aqueous solution with an organic solvent (e.g., ether, ethyl acetate or toluene) and the basic product liberated from the acid solution by making the solution strongly basic. The product thus liberated may be taken up in an organic solvent (e.g., ether, chloroform, ethyl acetate or toluene) dried over an anhydrous salt which will form a hydrate (e.g., sodium sulfate, potassium carbonate or calcium sulfate), concentrated and distilled in vacuo.

The compounds of this invention (Formula I), may be converted to and are most conveniently employed in the form of non-toxic pharmaceutically acceptable acid addition [or quaternary ammonium] salts. Such salts also have improved water-solubility. Although the non-toxic salts are preferred, any salt may be prepared for use as a chemical intermediate, as in the preparation of another, but non-toxic salt. The free basic compounds of Formula I may be alternatively, conveniently converted to their [quaternary ammonium or] acid addition salts by reaction of the free base with the selected acid [or acid ester, e.g., an alkyl, cycloalkyl, alkenyl, cycloalkenyl or aralkyl halide, sulfate, or sulfonate], preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side effects ascribable to the anions.

Appropriate acid addition salts are those derived from mineral acids such as hydrochloric acid, hydrobromic acid, hydriodic acid, nitric acid, sulfuric acid, and phosphoric acid; and organic acids such as acetic acid, citric acid, lactic acid, fumaric acid, and tartaric acid. [The quaternary ammonium salts are obtained, e.g., by the addition of alkyl, cycloalkyl, alkenyl, cycloalkenyl, or aralkyl esters of organic sulfonic acids, to the free base form of the selected tertiary amino compounds. The alkyl, cycloalkyl, alkenyl, cycloalkenyl, or aralkyl esters so used include such compounds as methyl chloride, methyl bromide, methyl iodide, ethyl bromide, propyl chloride, allyl chloride, allyl bromide, dimethyl sulfate, methyl-benzenesulfonate, methyl-p-toluene sulfonate, benzyl halides such as p-chlorobenzyl chloride and p-nitrobenzyl chloride, and the like.]

The *acid* [acide] addition salts are prepared either by dissolving the free base in an aqueous solution containing the appropriate acid and isolating the salt by evaporating the solution, or by reacting the free base and the selected acid in an organic solvent, in which case, the salt ordinarily separates directly or can be recovered by concentration of the solution. The free base may also be obtained by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness, fractionally distilling, or isolating in any other conventional manner.

The terms as used herein to define the symbols in any of the formulas given above, or where they appear elsewhere in the specification and claims hereof, have the following significance:

"Lower-alkyl" includes straight and branched chain radicals of up to eight carbon atoms inclusive, and is exemplified by such groups as methyl, ethyl, propyl, isopropyl, tertiary butyl, amyl, isoamyl, hexyl, heptyl, octyl, and the like;

"Cycloalkyl" includes primarily cyclic alkyl radicals containing three up to nine carbon atoms inclusive and encompasses such groups as cyclopropyl, cyclobutyl, cyclohexyl, cyclopentyl, propylcyclopentyl, dimethylcyclohexyl, cycloheptyl, and cyclooctyl;

"Substituted phenyl" radical is a phenyl radical substituted by a radical or radicals which are not reactive or otherwise interfering under the conditions of reaction, such radicals including lower-alkoxy, lower-alkyl, di-lower-alkylamino, trifluoro-methyl, halo, and the like. The substituted phenyl radicals have preferably no more than one to three *substituents* [substituents] such as those given above and, furthermore, these *substituents* [substitutents] can be in various available positions of the phenyl nucleus and, when more than one *substituent* [substitutent] is present, can be the same or different and can be in various position combinations relative to each other. The lower-alkoxy, lower-alkyl and di-lower-alkylamino *substituents* [substitutents] each have preferably from one to four carbon atoms which can be arranged as straight or branched chains. A total of nine carbon atoms in all ring substituents, making a total of fifteen carbon atoms in the radical, is the preferred maximum.

The following examples are given by way of illustration only and are not to be construed as limiting.

[EXAMPLE 1C

Product: 3-(α-methylbenzylidene)-pyrrolidine.—A solution of 31 g. of α-methyl-α-phenyl - 3 - pyrrolidinemethanol hydrochloride in 50 ml. of 12 N HCl was prepared and heated on a steam bath for 15 minutes. The solution was cooled, diluted with ice-water and treated with cold 25% sodium hydroxide until basic. A gummy precipitate resulted which was extracted into chloroform and then dried over magnesium sulfate and evaporated under reduced pressure to an oil. The product distilled at 160–162° C./15 mm.: yield 14.6 grams (62%). The nuclear magnetic resonance spectrum indicated that the product was a mixture of isomers.

*Analysis.*—Calculated for $C_{12}H_{15}N$: C, 83.19; H, 8.73; N, 8.09. Found: C, 83.08; H, 8.71; N, 8.04.]

EXAMPLE 2

Product: 1-benzyl-3-diphenylmethylene-pyrrolidine hydrochloride.—1-benzyl-α,α-diphenyl - 3 - pyrolidine methanol (34.4 g.; 0.10 mole) was mixed with 250 ml. of 6 N HCl, and 50 ml. of 95% ethanol, stirred, heated to reflux temperature and refluxed overnight. An oily layer separated to the bottom on cooling. The oily layer was separated and partitioned between dilute caustic solution and ether. The ether layer was separated, washed with water, dried over magnesium sulfate, filtered and concentrated by evaporation. The product was an oil, and a hydrochloride salt was formed therefrom by preparing an isopropanol solution and treating with ethereal HCl. The salt recrystallized finally in a white, crystalline form from isopropanol containing a trace of acetone and vacuum dried to a final melting point of 167–168° C. Yield of the white crystals: 20.8 grams, 57.5%.

Analysis.—Calculated for $C_{24}H_{24}ClN$: C, 79.65; H, 5.58; N, 3.87. Found: C, 79.59; H, 6.65; N, 3.84.

[EXAMPLE 3

Product: 3 - diphenylmethylenepyrrolidine hydrochloride.—A mixture of α,α-diphenyl-3-pyrrolidinemethanol (21.4 grams, or 0.08 mole) and 300 ml. of 6 N HCl was prepared and heated to reflux temperature. Dehydration occurred rapidly precipitating the hydrochloride salt product. The reaction mixture was allowed to cool and the product removed by suction filtration, washed with water, and vacuum dried. Upon recrystallization from water with a trace of isopropanol, the product had a final melting point of 268–271° C.

*Analysis.*—Calculated for $C_{17}H_{17}NCl$: $Cl^-$, 13.05; N, 5.15. Found: $Cl^-$, 13.05; N, 5.20.]

EXAMPLE [4] 3

Product: 1 - benzyl-3-(methylphenylmethylene)-pyrrolidine.—Ten grams of 1-benzyl-α-methyl-α-phenyl-3-pyrrolidinemethanol and 100 ml. of 6 N HCl were combined, heated to reflux temperature, refluxed for 16 hours and cooled. The reaction mixture was then made basic by addition of 25% sodium hydroxide. An oily layer which formed was extracted with ether and the combined extracts were washed with water and finally dried over magnesium sulfate. After evaporation of the solvent, the residual oil was distilled at reduced pressure and the fraction boiling at 125–127° C./.01 mm., was collected. The non-viscous nearly water-white oil product weighed 7.0 grams (75% yield).

Analysis.—Calculated for $C_{19}H_{21}N$: C, 86.64; H, 8.04. Found: C, 86.54; H, 7.96.

EXAMPLE [5] 4

Product: 3-cyclohexylphenylmethylene-1-methylpyrrolidine.—A mixture of 6.0 g. of 1-methyl-α-cyclohexyl-α-phenyl-3-pyrrolidine methanol and 50 ml. of 6 N hydrochloric acid was refluxed for 16 hours under an atmosphere of nitrogen, cooled and made basic with 25% hydroxide. The oil which separated was extracted with benzene and the combined extracts were washed several times with water. After the solvent was evaporated, the residual oil was distilled at reduced pressure and the fraction boiling at 105–107° C./.07 mm. collected. The water-white, non-viscous oil weighed 4.1 grams (73% yield).

Analysis.—Calculated for $C_{18}H_{15}N$: C, 84.65; H, 9.87. Found: C, 84.68; H, 10.08.

EXAMPLE [6] 5

Product: 1-(2-phenylethyl)-3-diphenylmethylenepyrrolidine.—A solution containing 16.0 g. (0.045 mole) of 1-(2-phenylethyl)-α,α-diphenyl-3-pyrrolidinemethanol, 125 ml. 6 N HCl, and 75 ml. ethanol was refluxed with stirring for 6 hours. Upon cooling, the oil which separated was partitioned between water and ether. The aqueous layer was made basic with $K_2CO_3$ and the base-insoluble oil extracted with ether. The ether extracts were dried over $Na_2SO_4$, filtered, evaporated, and the remaining oil was vacuum distilled, B.P. 197–200° C./7.5μ to yield 8.3 grams of viscous oil. A sample of the oil was analyzed.

Analysis.—Calculated for $C_{25}H_{25}N$: C, 88.45; H, 7.42; N, 4.13. Found: C, 88.33; H, 7.33; N, 4.30.

In the manner of the dehydration method described above and, particularly in accord with the foregoing examples, the following may be prepared from the stated reactants:

(a) 1 - ethyl-3-cyclohexylphenylmethylene pyrrolidine from 1 - ethyl-α-cyclohexyl-α-phenyl-3-pyrrolidinemethanol.

(b) 1-methyl-3-cyclohexylphenylmethylene pyrrolidine from 1-methyl-α-cyclohexyl-α-phenyl-3-pyrrolidine methanol.

(c) 1-(2-phenylethyl)-3-diphenylmethylene pyrrolidine from1-(2 - phenylethyl)-α-α-diphenyl-3-pyrrolidinemethanol.

(d) 1-(o-chlorobenzyl - 3 - di-(p-methoxyphenyl)-methylene pyrrolidine from 1-(o-chlorobenzyl)-α,α-di(p-methoxyphenyl)-3-pyrrolidinemethanol.

(e) 1-cyclohexyl-3-methylphenylmethylene pyrrolidine from 1-cyclohexyl-α-methyl - α - phenyl-3-pyrrolidinemethanol.

(f) 1-(2-phenoxyethyl) - 3 - (p-chlorophenyl)-phenylmethylene pyrrolidine from 1-(2-phenoxyethyl)-α-(p-chlorophenyl)-α-phenyl-3-pyrrolidinemethanol.

(g) 1-(2-phenylaminoethyl) - 3 - (m-trifluoromethylphenyl)-phenylmethylene pyrrolidine from 1-(2-phenylaminoethyl)-α-phenyl - α - (m-trifluoromethylphenyl)-3-pyrrolidinemethanol.

(h) 1-phenyl - 3 - (o-chlorophenyl)-phenylmethylene pyrrolidine from 1-phenyl-α-(o-chlorophenyl)-α-phenyl-3-pyrrolidinemethanol.

(i) 1-(o-tolyl)-3-(o-methoxyphenyl)-phenylmethylene pyrrolidine from 1-o-tolyl-α-(o-methoxyphenyl)-α-phenyl-3-pyrrolidinemethanol.

(j) 1-ethyl - 3 - di-(p-tolyl)-methylene pyrrolidine from 1-ethyl-α,α-di(p-tolyl)-3-pyrrolidinemethanol.

(k) 1-ethyl - 3 - ethyl-(p-dimethylaminophenyl)-methylene pyrrolidine from 1 - ethyl-α-ethyl-α-(p-dimethylaminophenyl)-3-pyrrolidinemethanol.

(l) 1-methyl - 3 - phenyl-(p-tolyl)-methylene pyrrolidine from 1 - methyl-α-phenyl-α-(p-tolyl)-3-pyrrolidinemethanol.

(m) 1-methyl - 3 - phenylmethylene pyrrolidine from 1-methyl-α-phenyl-3-pyrrolidinemethanol.

[(n) 3-phenyl-3-(m-trifluoromethylphenyl)-methylene pyrrolidine from α-phenyl-α-(m-trifluoromethylphenyl)-3-pyrrolidinemethanol.

(o) Di-(p-tolyl)-methylene pyrrolidine from α,α,-di-(p-tolyl)-3-pyrrolidinemethanol.]

Effective quantities of any of the foregoing pharmacologically active compounds of Formula I may be administered to a living animal body for therapeutic purposes according to usual modes of administration and in usual forms, such as orally, in solutions, emulsions, suspensions, pills, tablets and capsules, or intramuscularly or parenterally in the form of sterile solutions or suspensions, and intravenously, in some cases, also in sterile solutions.

Amphetamines and barbiturates are frequently useful in depression therapy, as well as tranquilizers. In practicular, the use of tranquilizing drugs as with sedatives and the amphetamine group have shown valuable results especially with disturbed and agitated cases of depression. This invention is, therefore, intended to encompass the combined use of the foregoing with the anti-depressant compounds hereof, as well as with other drugs used adjunctively in depression control and treatment. Thus, the compounds of this invention may be administered alone or in combination with other pharmacologically effective agents such as psychomotor stimulants, sedatives, tranquilizers and sedative-level dosages of tranquilizers, etc., as well as buffers and usual pharmaceutical carriers or diluents. Examples of some of these drugs are: phenobarbital, sodium phenobarbital, meprobamate, chlordiazepoxide hydrochloride, butaperazine, methamphetamine, amphetamine, dextroamphetamine.

Although very small quantities of the active materials of the present invention are effective when minor therapy is involved or in cases of administration to subjects having a relatively low body weight, unit dosages are usually from 5 milligrams or above and preferably 25, 50 or 100 milligrams or even higher, depending of course upon the emergency of the situation and the particular result desired. Five to 50 milligrams appears optimum per unit dose, or usual broader ranges appear to be 1 to 100 milligrams per unit dose. Daily dosages should preferably range from 10 mg. to 100 mg. The active ingredients of the invention may be combined with other pharmacologically active agents as stated above. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages will, of course, be determined according to standard medical principles under the direction of a physician or veterinarian.

The following formulations are representative for all of the pharmacologically active compounds of this invention, but have been especially designated to embody as active ingredient the 1 - lower-alkyl-3,3-diphenyl-methylene-pyrrolidines, especially the 1-ethyl and 1-isopropyl compounds.

FORMULATIONS

(1) Capsules

Capsules of 10 mg., 25 mg., and 50 mg. of active ingredient per capsule are prepared. With the higher amounts of active ingredient, reduction may be made in the amount of lactose.

| Typical blend for encapsulation: | Per capsule, mg. |
|---|---|
| Active ingredient, as salt | 10 |
| Lactose | 259 |
| Starch | 126 |
| Magnesium stearate | 4 |
| Total | 399 |

Additional capsule formulations preferably contain a higher dosage of active ingredient and are as follows:

| Ingredients | 100 mg. per capsule | 250 mg. per capsule | 500 mg. per cpasule |
|---|---|---|---|
| Active ingredient, as salt | 100 | 250 | 500 |
| Lactose | 214 | 163 | 95 |
| Starch | 87 | 81 | 47 |
| Magnesium stearate | 4 | 6 | 8 |
| Total | *406* [399] | 500 | 650 |

In each case, uniformly blend the selected active ingredient with lactose, starch, and magnesium stearate and encapsulate the blend.

(2) Tablets

A typical formulation for a tablet containing 10.0 mg. of active ingredient per tablet follows. The formulation may be used for other strengths of active ingredient by adjustment of weight of dicalcium phosphate.

| | Per tablet, mg. |
|---|---|
| 1. Active ingredient | 10.0 |
| 2. Corn starch | 15.0 |
| 3. Corn starch (paste) | 12.0 |
| 4. Lactose | 35.0 |
| 5. Dicalcium phosphate | 132.0 |
| 6. Calcium stearate | 2.0 |
| Total | [207.0] *206.0* |

Uniformly blend the active ingredient, lactose, dicalpaste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredients and are as follows:

A. 50 mg. tablet

| Ingredients: | Per tablet, mg. |
|---|---|
| Active ingredient, as salt | 50.0 |
| Lactose | 100.0 |
| Milo starch | 50.0 |
| Corn starch | 50.0 |
| Calcium stearate | 2.0 |
| Total | 252.0 |

Uniformly blend the active ingredient, lactose, milo starch, and corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

B. 100 mg. tablet

| Ingredients: | Per tablet, mg. |
|---|---|
| Active ingredient, as salt | 100.0 |
| Lactose | 90.0 |
| Dicalcium phosphate | 90.0 |
| Starch | 33.0 |
| Milo starch | 17.0 |
| Calcium stearate | 2.0 |
| Total | 332.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

C. 250 mg tablet

| Ingredients: | Per tablet, mg. |
|---|---|
| Active ingredient, as salt | 250.0 |
| Corn starch | 20.0 |
| Carbowax 6000, (polyethylene glycol of M.W. approximately 6000) | 10.0 |
| Lactose | 20.0 |
| Magnesium stearate | 2.0 |
| Total | 302.0 |

Uniformly blend the active ingredient, Carbowax 6000, lactose, and one-half the weight of magnesium stearate required. This blend is then "slugged" on a suitable tablet press. These "slugs" are granulated through a ten mesh screen on an oscillating granulator. These granules are then blended with the remainder of the magnesium stearate and the lubricated granules are then converted into tablets on a suitable tablet press.

D. 500 mg. tablet

| Ingredients: | Per tablet, mg. |
|---|---|
| Active ingredient, as salt | 500.0 |
| Corn starch (wet) | 50.0 |
| Milo starch | 20.0 |
| Calcium stearate | 6.0 |
| Corn starch (dry) | 20.0 |
| Total | 596.0 |

Uniformly blend the active ingredient, corn starch and milo starch. This blend is wet granulated using water and the wet mass is passed through a number eight mesh screen. These wet granules are dried overnight at 140–160 degrees Fahrenheit. The dried granules are passed through a number ten mesh screen. The dried granules and weighed amounts of corn starch and calcium stearate are uniformly blended and these lubricated granules are compressed on a suitable tablet press.

(3) Injectable-2% sterile solution

| | Per cc. |
|---|---|
| Active ingredient ____mg. | 5.0 |
| Preservative, e.g., chlorobutanol, percent wt./vol. | 0.5 |
| Water for injection | q.s. |

Prepare solution, clarify by filtration, fill into vials, seal, and autoclave.

(4) The pharmacologically active compounds provided by the present invention may also be edministered successfully by embodying an effective quantity thereof in an injectable suspension for injection into an animal body, in oral powders, suspensions or syrups, and in other acceptable dosage forms.

We claim:

1. A method for the treatment of an animal afflicted with an emotional disorder associated with depression which comprises administering to said animal in an amount sufficient to relieve said depression, a member selected from the group consisting of *a 1-substituted*-3-di-substituted-methylene *pyrrolidine* [pyrrolidines] of the formula:

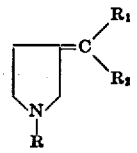

wherein R is selected from the group consisting of [hydrogen,] lower alkyl, phenyl lower alkyl, cycloalkyl, phenoxy lower alkyl, phenylamino lower alkyl and substituted phenyl wherein said substituent is a member selected from the group consisting of lower alkyl, halogen, trifluoromethyl, lower alkoxy and di-lower alkylamino, $R_1$ is selected from the group consisting of lower alkyl, phenyl lower alkyl, cycloalkyl, phenyl and substituted phenyl wherein said substituent is a member selected from the group consisting of lower alkyl, halogen, trifluoromethyl, lower alkoxy, and di-lower alkylamino and $R_2$ is a member selected from the group consisting of phenyl, and substituted phenyl wherein said substituent is a member selected from the group consisting of lower alkyl, halogen, trifluoromethyl, lower alkoxy and di-lower alkylamino and *an* [quaternary ammonium and] acid addition *salt* [salts] thereof.

2. Method according to claim 1 which comprises administering to said animal from 1 to 500 mg. of said compound.

3. Method according to claim 1 wherein said compound is 1-lower-alkyl-3-diphenyl-methylene pyrrolidine.

4. Method according to claim 1 wherein said compound is 1-lower-alkyl-[3,]3-di-substituted phenylmethylene pyrrolidine.

5. Method according to claim 1 wherein said compound is 1-lower-alkyl-3-(substituted phenyl) phenylmethylene pyrrolidine.

[6. Method according to claim 1 wherein said compound is 3-substituted phenyl, phenylmethylene pyrrolidine.]

[7. Method according to claim 1 wherein said compound is 3-di-substituted phenyl-methylene pyrrolidine.]

[8. Method according to claim 1 wherein said compound is 3-di-phenylmethylene pyrrolidine.]

[9.] *6.* Method according to claim 1 wherein said compound is 1-ethyl-[3,]3-diphenylmethylene pyrrolidine.

[10.] *7. An antidepressant* [antidepresant] composition comprising 1 to 500 mg. of a member selected from the group consisting of 1-ethyl-3-phenylmethylene pyrrolidine [, quaternary ammonium] and *an* acid addition *salt* [salts] thereof in admixture with a pharmaceutically acceptable carrier.

References Cited

The following references, cited by the Examiner, are of record in the patented file of this patent or the original patent.

FOREIGN PATENTS 654,416 4/1965 Belgium.

OTHER REFERENCES

Chem. Abst. 63: 18034b (1965).

STANLEY J. FRIEDMAN, Primary Examiner

UNITED STATES PATENT OFFICE

CERTIFICATE OF CORRECTION

Patent No. RE 28141 Dated August 27, 1974

Inventor(s) Carl D. Lunsford et al.

It is certified that error appears in the above-identified patent and that said Letters Patent are hereby corrected as shown below:

Col. 3, line 38 "Formula I"

should read --Formula II--

Signed and sealed this 7th day of January 1975.

(SEAL)
Attest:

McCOY M. GIBSON JR.
Attesting Officer

C. MARSHALL DANN
Commissioner of Patents